United States Patent
Shah et al.

(10) Patent No.: US 7,669,020 B1
(45) Date of Patent: Feb. 23, 2010

(54) HOST-BASED BACKUP FOR VIRTUAL MACHINES

(75) Inventors: Sunil Shah, Fremont, CA (US); Robert P. Rossi, Altamonte Springs, FL (US)

(73) Assignee: Symantec Operating Corporation, Mountain View, CA (US)

( * ) Notice: Subject to any disclaimer, the term of this patent is extended or adjusted under 35 U.S.C. 154(b) by 865 days.

(21) Appl. No.: 11/119,600

(22) Filed: May 2, 2005

(51) Int. Cl.
G06F 13/28 (2006.01)

(52) U.S. Cl. ...................................... 711/162; 717/148

(58) Field of Classification Search .................. 717/148; 711/162
See application file for complete search history.

(56) References Cited

U.S. PATENT DOCUMENTS

| | | | |
|---|---|---|---|
| 6,131,148 A * | 10/2000 | West et al. ................... | 711/162 |
| 6,446,175 B1 * | 9/2002 | West et al. ................... | 711/162 |
| 6,453,392 B1 | 9/2002 | Flynn, Jr. | |
| 6,934,755 B1 | 8/2005 | Saulpaugh et al. | |
| 7,093,086 B1 * | 8/2006 | van Rietschote ............ | 711/161 |
| 7,308,545 B1 * | 12/2007 | Kekre et al. .................. | 711/162 |
| 7,337,286 B1 * | 2/2008 | West et al. ................... | 711/161 |
| 7,424,590 B2 * | 9/2008 | Shinozaki et al. ........... | 711/170 |
| 2006/0225065 A1 * | 10/2006 | Chandhok et al. ........... | 717/168 |

OTHER PUBLICATIONS

Brendan Cully "Generalized High Availability via Virtual Machine Replication" 2001, pp. 1-61.*
"Microsoft Virtual Server 2005 Technical Overview," Microsoft Corporation, Sep. 29, 2004, p. i-26.
VERITAS Backup Exec™ 9.1 for Windows Servers, VERITAS, Jan. 21, 2004, pp. 1-6.

* cited by examiner

*Primary Examiner*—Wei Y Zhen
*Assistant Examiner*—Phillip H Nguyen
(74) *Attorney, Agent, or Firm*—Meyertons, Hood, Kivlin, Kowert & Goetzel, P.C.

(57) ABSTRACT

A system, method, and computer-accessible medium for centralized backup of a plurality of virtual machines are disclosed. Each virtual machine comprises at least one virtual volume. The plurality of virtual volumes are accessed through a central computer system. The central computer system is used to backup data from the plurality of virtual volumes in a manner substantially independent of execution of the plurality of virtual machines.

17 Claims, 9 Drawing Sheets

HOST-BASED BACKUP FOR VIRTUAL MACHINES

BACKGROUND

1. Field of the Invention

This invention relates to data storage techniques and, more particularly, to storage techniques for storage associated with virtual machines.

2. Description of the Related Art

As the performance of server platforms has continued to improve, software technologies have evolved to help users more effectively harness that improved performance. Virtual machines are one such technology. A virtual machine enables a user to run multiple operating systems concurrently on a single physical server, thereby providing more flexible utilization of the underlying hardware.

As used herein, a virtual machine comprises any combination of software, one or more data structures in memory, and/or one or more files stored on one or more storage devices. The virtual machine may mimic or otherwise represent the software and hardware used during execution of a given application(s) or system software. Thus, a virtual machine may include a virtual CPU, virtual I/O devices, etc. The virtual machine in which an application is executing may encompass the entire system state associated with an application.

Figure 1:
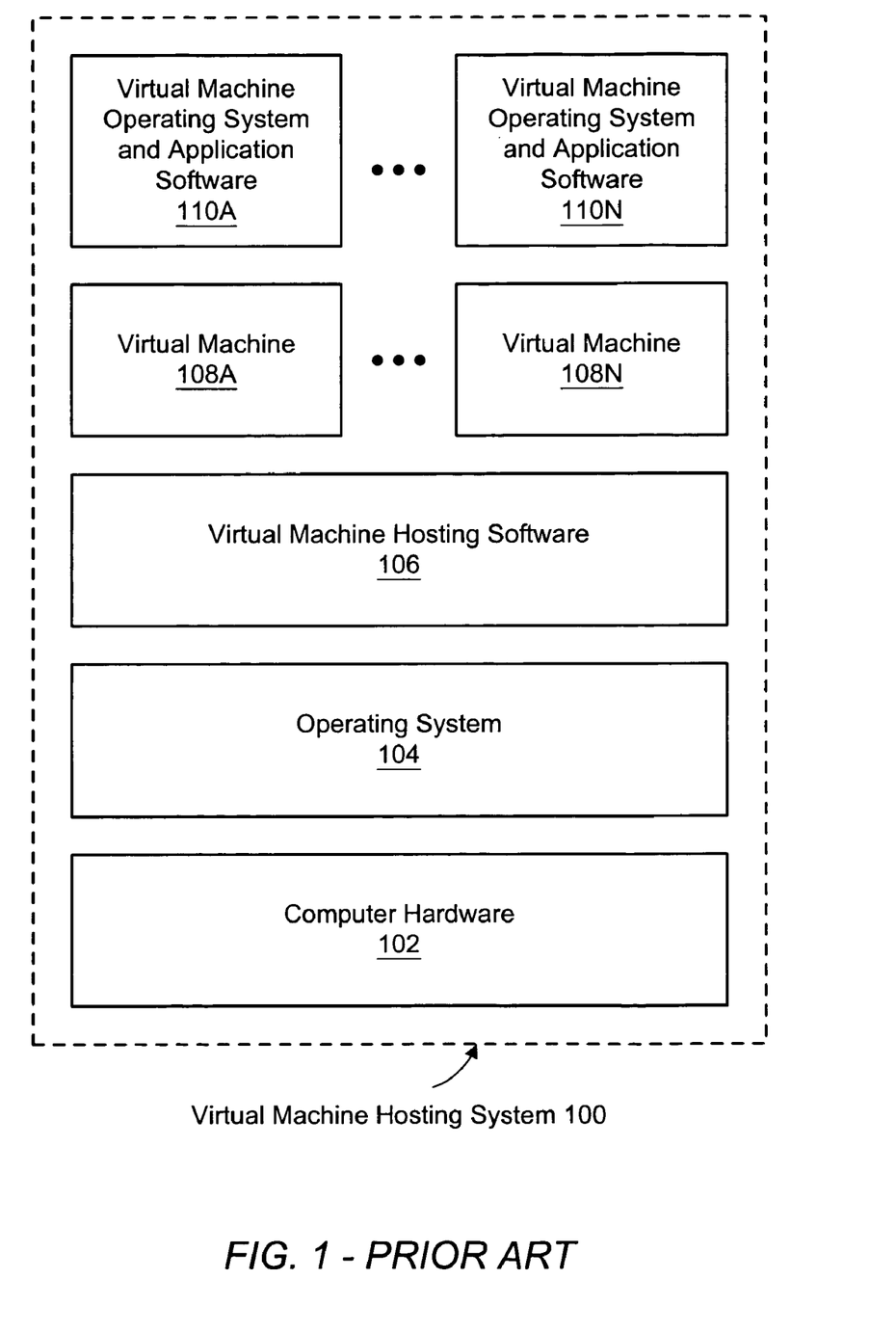
FIG. 1 illustrates a virtual machine architecture.

FIG. 1 illustrates a standard virtual machine architecture, e.g., for use in a virtual machine hosting system 100. The virtual machine hosting system 100 includes a host computer system as a platform for hosting one or more virtual machines. The host computer system typically includes computer hardware 102, an operating system 104, and virtual machine hosting software 106. The architecture of a typical computer system which is suitable for use as a virtual machine hosting system 100 is further described below with reference to FIG. 9.

The virtual machine hosting software 106 may be configured to generate and host one or more virtual machines. A virtual machine may be referred to as a "guest" of the host computer system. In the example configuration shown in FIG. 1, virtual machines 108A-108N are hosted by the virtual machine hosting software 106. Other combinations and numbers of virtual machines are possible in other configurations. The virtual machine hosting software 106 may schedule virtual machines for execution on the underlying hardware 102 and handle traps from the virtual machines (e.g., virtual hardware accesses, instruction execution exceptions, etc.). The virtual machine hosting software 106 may also be referred to herein as a virtual machine (VM) kernel.

Various types of virtual machine hosting software 106 may be used in various configurations. In one configuration, the virtual machine hosting software 106 may comprise the Microsoft Virtual Server product available from Microsoft Corp. (Redmond, Wash.). In one configuration, the virtual machine hosting software 106 may comprise the GSX product available from VMWare, Inc. (Palo Alto, Calif.), now owned by EMC Corporation. In another configuration, the virtual machine hosting software 106 may comprise the Virtual PC product available from Connectix Corporation (San Mateo, Calif.), now owned by Microsoft Corp. In yet another configuration, the virtual machine hosting software 106 may comprise a Java Virtual Machine (JVM) product available from Sun Microsystems, Inc. (Santa Clara, Calif.). In other configurations, the virtual machine hosting software 106 may include virtual machine technologies for the Linux platform such as user mode Linux (UML) virtual machines or plex86.

It is noted that the virtual machine hosting software 106 may also be referred to as a virtual machine monitor (VMM) such as the VMMs used on mainframe computer systems such as those available from International Business Machines Corporation (Armonk, N.Y.). In the illustrated configuration, the virtual machine hosting software 106 may execute on the client operating system 104. In other configurations, the virtual machine hosting software 106 may execute directly on the underlying hardware (i.e., without an underlying operating system). For example, the ESX product available from VMWare, Inc. may be used in this manner.

The various virtual machines 108A-108N may emulate various types and configurations of computer hardware. Accordingly, each of the virtual machines 108A-108N may comprise a virtual CPU which is configured to execute a particular instruction set. Each of the virtual machines 108A-108N may further be configured to emulate a hardware environment with a particular set of device drivers, I/O resources, memory and storage resources, network resources, etc. These virtual resources may be mapped to actual resources in the supporting operating system 104 and/or underlying computer hardware 102. In some configurations, the virtual hardware emulated by a particular virtual machine may be similar to the underlying computer hardware 102. In other configurations, the virtual hardware in a particular virtual machine may emulate a different platform.

Each virtual machine 108A-108N may be configured to execute a respective package of virtual machine operating system (OS) and application software 110A-110N which is configured for execution on its respective virtual hardware. Each virtual machine 108A-108N mimics a hardware platform or environment used during execution of a given operating system or application. The software 110A-110N may also be executable on a "real-world" platform, and the virtual nature of the execution environment of the virtual machine 108A-108N may be transparent to the software 110A-110N. In various configurations, different virtual machines which execute on the same virtual machine hosting system 100 may include different operating systems. Different virtual machines may employ different versions of the same OS (e.g. Microsoft Windows NT with different service packs installed), different versions of the same OS family (e.g. Microsoft Windows NT and Microsoft Windows2000), or different OSs (e.g. Microsoft Windows NT, Linux, Sun Solaris, etc.).

The virtual machine in which an application is executing may encompass the entire system state associated with an application. Generally, when a virtual machine is active (i.e., when the application within the virtual machine is executing), the virtual machine may be stored in the memory of the computer system 100 on which the virtual machine is executing and in the files on the non-virtual storage device which are mapped to the virtual storage devices in the virtual machine. In some configurations, the virtual machine hosting software 106 may support a paging system in which various pages of the memory storing the virtual machine may be paged out to local storage in the computer system 100. The virtual machine hosting software 106 may support a command to suspend the virtual machine. In response to the command, the virtual machine hosting software 106 may write an image of the virtual machine to a non-virtual storage device, thus capturing the current state of the executing application. The image may include one or more files written in response to the suspend command, thereby capturing the state of the virtual machine that was in memory in the computer system, as well as the files stored on the non-virtual storage device that represent the virtual disks included in the virtual machine. The state may include not only files written by the application, but uncommitted changes to files which may still be in the memory within the virtual machine, the state of the hardware (including the virtual CPU and virtual memory) within the virtual machine, etc.

Each virtual machine 108A-108N may comprise virtual storage resources, i.e., storage resources which appear to be "real" from within the execution environment of a respective virtual machine. The integrity and security of the data stored on these virtual storage resources may be just as vital as that of data on non-virtual storage. However, current techniques for managing storage associated with virtual machines are inefficient and therefore costly. For example, backup and restore operations for virtual storage may require a system administrator to interact independently and repetitively with agent software or other data management software on each individual virtual machine.

Figure 2:
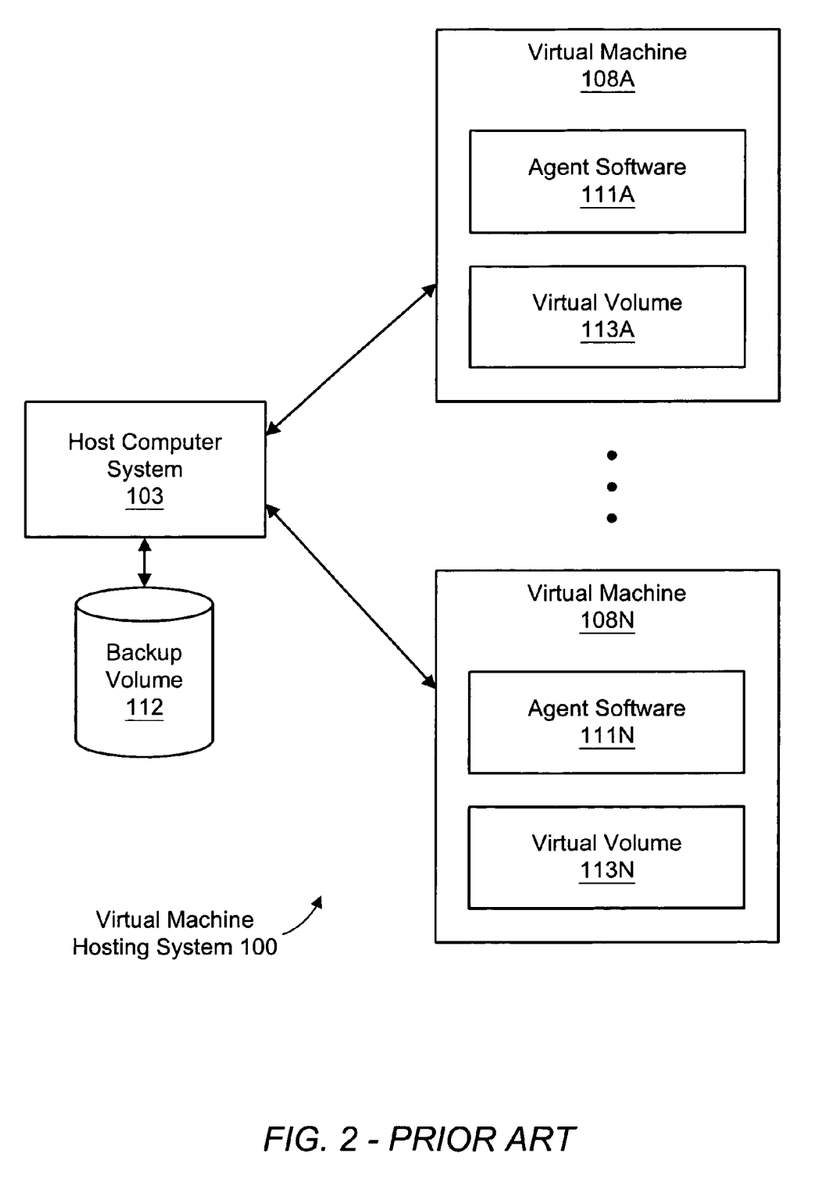
FIG. 2 illustrates a virtual machine hosting system employing agent software on a plurality of virtual machines.

FIG. 2 illustrates a virtual machine hosting system 100 employing agent software on a plurality of virtual machines. The host computer system 103 may include the computer hardware 102, operating system 104, and virtual machine hosting software 106 shown in FIG. 1. As is discussed above with reference to FIG. 1, the host computer system 103 may host a plurality of virtual machines 108A-108N. For their virtual storage resources, each of the virtual machines may comprise a respective virtual volume 113A-113N. Each of the virtual machines may run a respective instance of agent software 111A-111N. Each instance of the agent software 111A-111N may be configured to interact with the virtual volumes of the respective virtual machine 108A-108N as well as a storage management system on the host computer system 103 for backup of virtual storage on backup volume 112. For example, the storage management system may comprise the VERITAS Backup Exec product available from VERITAS Software Corporation (Mountain View, Calif.). The backup volume may comprise any storage device supported by the storage management system. Each agent may act as an intermediary between the respective virtual machine and the backup volume 112. In order to perform backup operations, restore operations, and other data management tasks on the virtual storage, each virtual machine must be managed through its agent as if it were an independent computer system. It is desirable to provide improved systems and methods for managing storage associated with virtual machines.

SUMMARY

A system, method, and computer-accessible medium for centralized backup of a plurality of virtual machines are disclosed. The virtual machines are hosted by a host computer system. Each virtual machine comprises at least one virtual volume. The method may comprise accessing the plurality of virtual volumes through a central computer system. In various embodiments, the central computer system may comprise the host computer system or an additional virtual machine. In one embodiment, the host computer system may access the data from the virtual volumes by directly accessing corresponding virtual volume files which are stored by the host computer system. In one embodiment, the central computer system may access the virtual volumes by locally mounting or importing them from the virtual machines.

The method may further include using the central computer system to backup data from the plurality of virtual volumes in a manner substantially independent of execution of the plurality of virtual machines. In bypassing the plurality of virtual machines, the data may be read without using agents or other software components executing on the plurality of virtual machines. A user interface may permit a user to browse the virtual volumes (e.g., in a parent-child hierarchy with any host volumes) and select data from the virtual volumes for storage management tasks such as backups. Backing up the data may comprise reading the data, sending the data to a backup volume, and storing the data on the backup volume. After the backup, the data or a subset of data may be restored to a target virtual volume.

In one embodiment, each virtual volume file stored by the host on a host volume may include the data from one or more virtual volumes. A snapshot may be generated for the host volume to capture the contents of the host volume at a particular point in time. Therefore, the snapshot may include the virtual volume files. The virtual volume files corresponding to the plurality of virtual volumes may be located within the snapshot and passed to a backup engine.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 3:
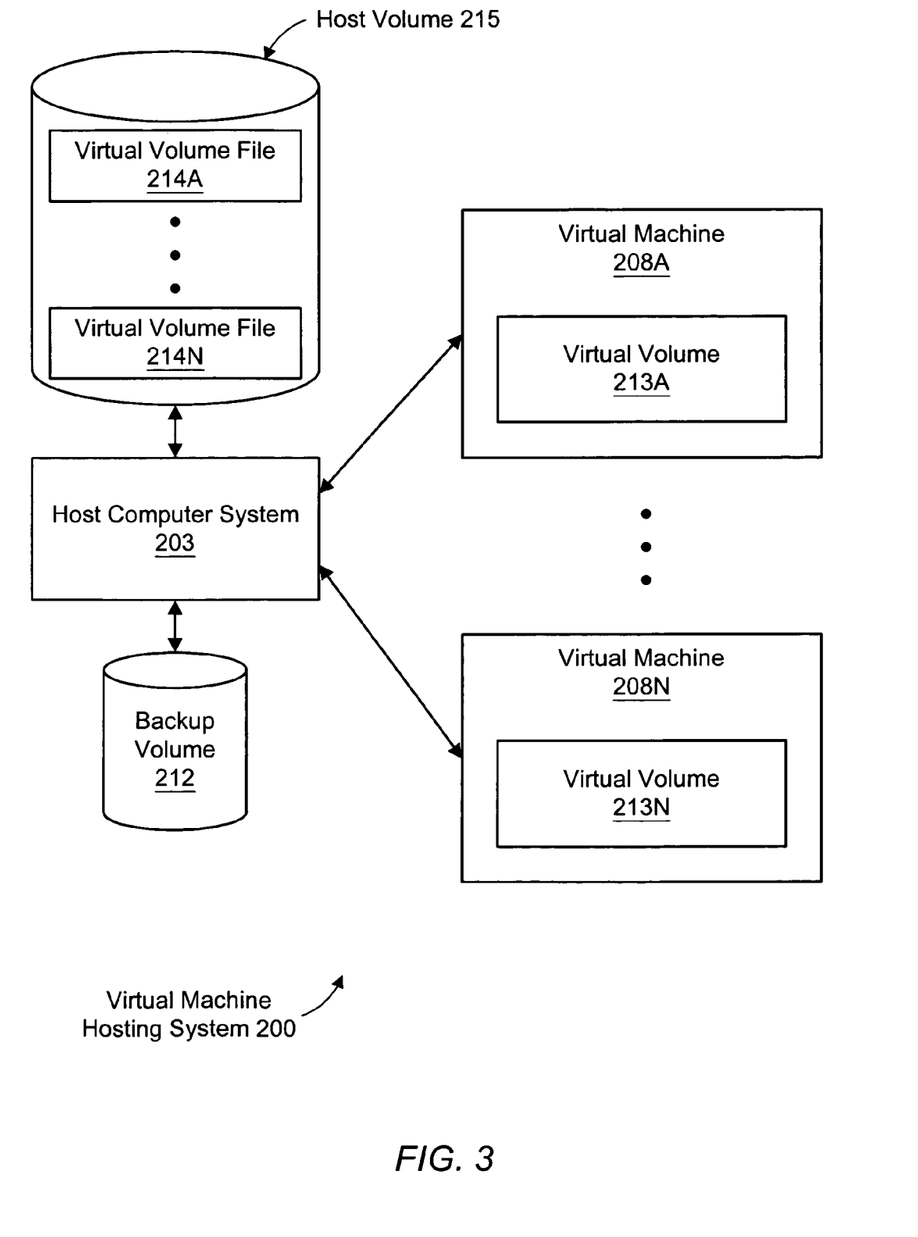
FIG. 3 illustrates a virtual machine hosting system for centralized backup of a plurality of virtual machines according to one embodiment.

Using the systems and methods described herein, storage associated with virtual machines may be managed (e.g., backed up or restored) in a centralized and efficient manner. FIG. 3 illustrates a virtual machine hosting system 200 for centralized backup of a plurality of virtual machines according to one embodiment. Other embodiments are possible and contemplated. The host computer system 203 may include computer hardware 102, operating system 104, and virtual machine hosting software 106 such as that shown in FIG. 1. As is discussed above with reference to FIG. 1, the host computer system 203 may host a plurality of virtual machines 208A-208N.

The host computer system 203 may be coupled to or may comprise storage such as a host volume 215. The host volume 215 may store virtual machine data which may be used in the hosting of the virtual machines 208A-208N. In one embodiment, the virtual machine data for each virtual machine may include a configuration file for each virtual machine 208A-208N. A configuration file may store configuration information for the virtual machine, such as the number of virtual disks, the size of the virtual disks, I/O and memory configuration, and other suitable data.

In one embodiment, the virtual machine data stored on the host volume 215 may comprise a plurality of virtual volume files 214A-214N. In one embodiment, each of the virtual volume files 214A-214N may correspond to one or more virtual volumes 213A-213N. The virtual volumes 213A-213N may be accessible as storage volumes by software executing on each respective virtual machine 208A-208N. The virtual volume files 214A-214N may include the data stored on the virtual volumes 213A-213N in the virtual machines. Thus, the virtual volume files 214A-214N may include some or all of the software (e.g., OS and applications), application and OS configuration files, and other suitable data for use or execution by the virtual machine.

The host computer system 203 may also be coupled to or may comprise storage such as a backup volume 212. In various embodiments, the backup volume 212 may be implemented using substantially any kind of storage device, including a hard disk, a tape drive, an optical storage device, and other suitable storage devices. The backup volume 212 may be used to backup and restore data from the virtual volumes 213A-213N. Instead of using agent software or other storage management software running on each virtual machine, however, the virtual machine hosting system 200 may bypass the virtual machines during backup or restoration. In one embodiment, for example, the virtual machine hosting system 200 may directly access the virtual volume files 214A-214N on the host volume 215 to perform storage management operations on the corresponding virtual volumes 213A-213N.

Figure 4:
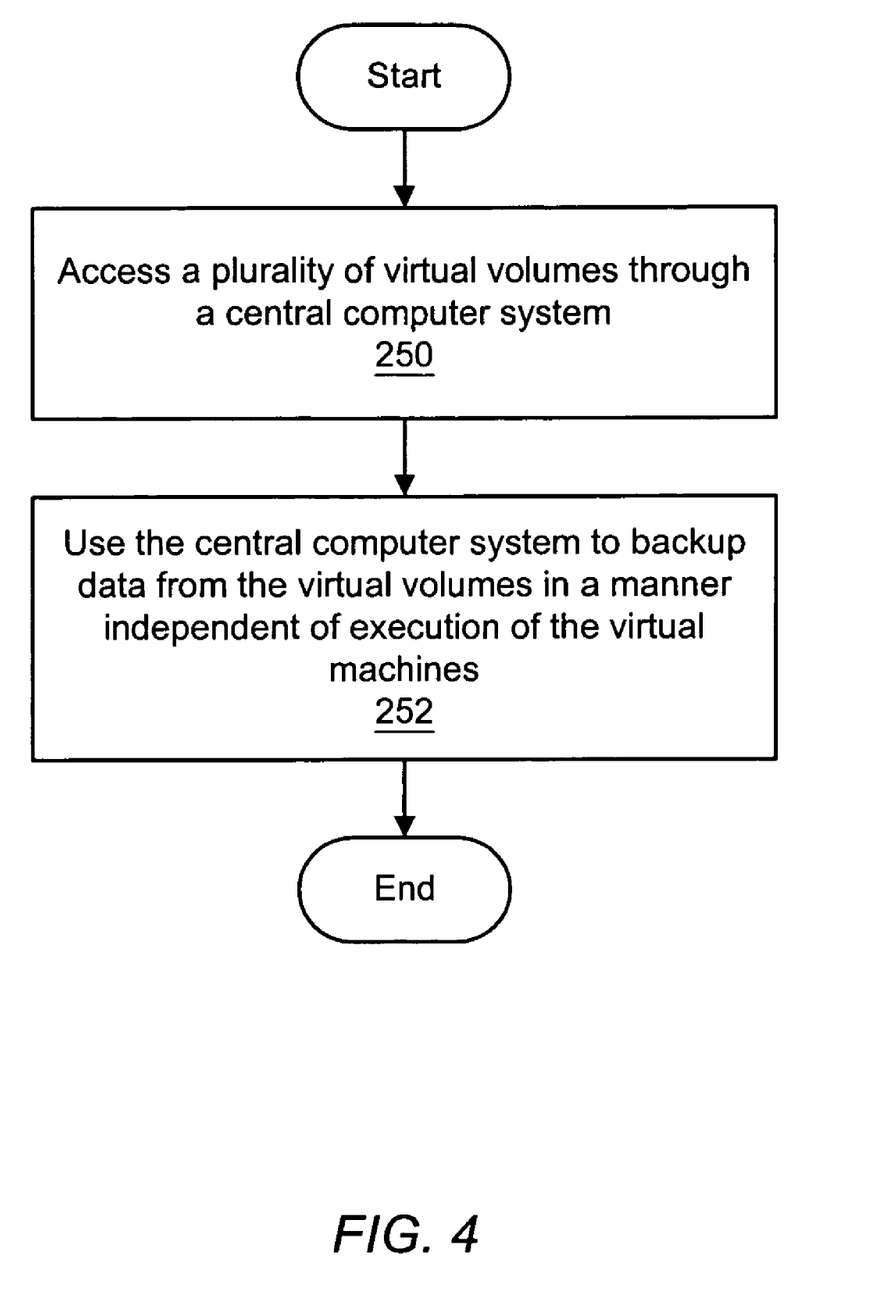
FIG. 4 is a flowchart illustrating a method for centralized backup of a plurality of virtual machines according to one embodiment.

FIG. 4 is a flowchart illustrating a method for centralized backup of a plurality of virtual machines according to one embodiment. Blocks that are implemented in software may represent a plurality of instructions comprising the software which, when executed on a suitable computer system, perform the function(s) described for the blocks. In 250, access to a plurality of virtual volumes may be gained through a central computer system. In an embodiment further described with reference to FIGS. 6 and 7, the central computer system may comprise a host computer system. In one embodiment, the host computer system may access the data from the virtual volumes 213A-213N by directly accessing the corresponding virtual volume files 214A-214N. In one embodiment, the host computer system may access the virtual volumes through the process of hosting the virtual machines, as is discussed above with reference to FIG. 1. In one embodiment, the host computer system may access the virtual volumes by locally mounting or importing them from the virtual machines. In an embodiment described with reference to FIG. 8, the central computer system may comprise another virtual machine, and access may be gained to the virtual volumes by locally mounting or importing them through virtual I/O channels to the other virtual machines.

In 252, the central computer system may be used to backup data from the plurality of virtual volumes in a manner substantially independent of execution of the plurality of virtual machines. In bypassing the plurality of virtual machines, the data may be read without using agents or other software components executing on the plurality of virtual machines. In one embodiment, the data may be read directly from the underlying virtual volume files 214A-214N stored on the host volume 215. In other embodiments, the data may be read from the virtual volumes after locally mounting or importing the virtual volumes at the central computer system. Backing up the data may comprise reading the data, sending the data to a backup volume 212, and storing the data on the backup volume 212.

In one embodiment, a subset of the data from the plurality of virtual volumes may be backed up. In one embodiment, at least one sequence of blocks from the plurality of virtual volumes may be backed up. In one embodiment, at least one file or directory from the plurality of virtual volumes may be backed up. The subset, sequence of blocks, or file or directory may be specified by a user.

In one embodiment, the data (or a subset thereof) may be restored from the backup volume 212 to the virtual volumes 213A-213N. The subset of data may be specified by a user. As with the backup process, the virtual machines may be bypassed in the restoration process, e.g., by writing the restored data directly to the virtual volume files 214A-214N or to locally mounted or imported virtual volumes 213A-213N.

A storage management system may be used to perform storage management tasks such as backup and restoration of data from the virtual volumes. In one embodiment, the storage management system may comprise the VERITAS Backup Exec product available from VERITAS Software Corporation (Mountain View, Calif.). At least part of the storage management system may run on the central computer system. For example, a Remote Agent for Windows Server (RAWS) component, also available from VERITAS Software Corporation, may run on the central computer system and communicate with a storage management console component on the same or a different computer system.

As is discussed above with reference to FIG. 4, the central computer system may access the virtual volumes 213A-213N by directly accessing the corresponding virtual volume files 214A-214N, by locally mounting or importing them from the virtual machines, or otherwise through the process of hosting the virtual machines. After accessing the virtual volumes, the central computer system may present the virtual volumes 213A-213N as child volumes of a parent volume such as the host volume 215. A user interface may permit a user to browse the parent-child hierarchy and select data from the virtual volumes for storage management tasks.

Figure 5:
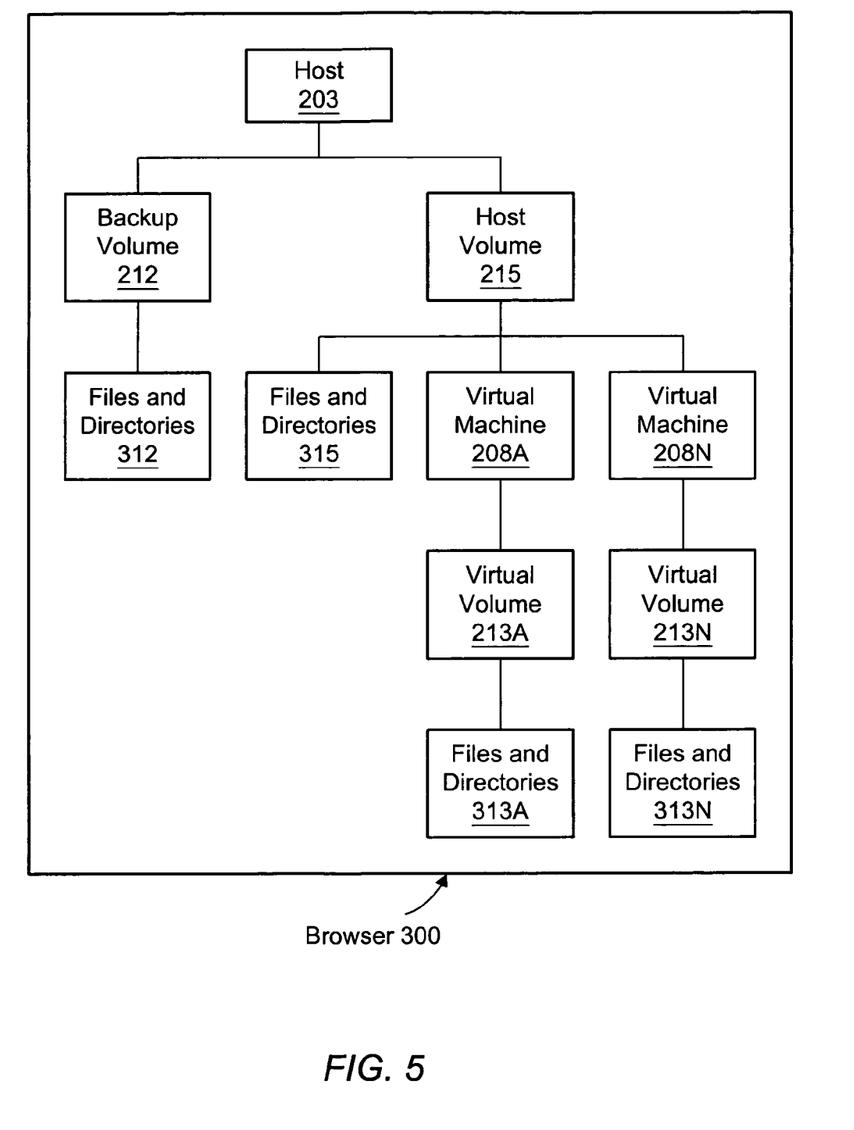
FIG. 5 illustrates a parent-child hierarchy of host volumes and virtual volumes in a virtual machine hosting system according to one embodiment.

FIG. 5 illustrates an example of a parent-child hierarchy of host volumes and virtual volumes in a virtual machine hosting system 200 according to one embodiment. Other configurations are possible and contemplated. The browser 300 may comprise a window in a graphical user interface (GUI). The browser 300 may permit a user to "drill down" from higher levels to lower levels in the storage hierarchy, select volumes or subsets thereof, and perform storage management tasks on the selections. Not all levels of the hierarchy may be visible at all times. At the top of the example hierarchy is the central computer system itself, e.g., the host 203. At the next level are the non-virtual volumes mounted by or otherwise accessible to the host: the backup volume 212 and the host volume 215. Beneath the backup volume 212, the user may access individual files and directories 312 from that volume. Beneath the host volume 215, the user may likewise access individual files and directories 315 from that volume. Because their corresponding virtual volume files 214A-214N and other configuration files are stored on the host volume 215, the virtual machines 208A-208N may be accessible as children of the host volume 215 or host 203. Beneath the virtual machines in the hierarchy are their respective virtual volumes 213A-213N and files and directories 313A-313N.

In one embodiment, the browser 300 may hide from the user the fact that the virtual volumes 213A-213N are not physical disks, but rather are based on corresponding virtual volume files 214A-214N. When a user chooses to "drill down" on a virtual machine (e.g., by clicking on a graphical representation of that virtual machine in the browser), the virtual machine hosting system 200 may find the appropriate virtual volume files 214A-214N for that virtual machine. The virtual machine hosting system 200 may then determine which virtual volumes 213A-213N can be created from the virtual volume files 214A-214N. By interpreting the virtual volume files 214A-214N as virtual volumes 213A-213N, the browser 300 may present the virtual volumes 213A-213N to the user without the need to run software on the virtual machines 208A-208N to access the virtual volumes 213A-213N. The process of interpreting the virtual volume files 214A-214N as virtual volumes 213A-213N is further described below with reference to FIGS. 6 and 7.

Figure 6:
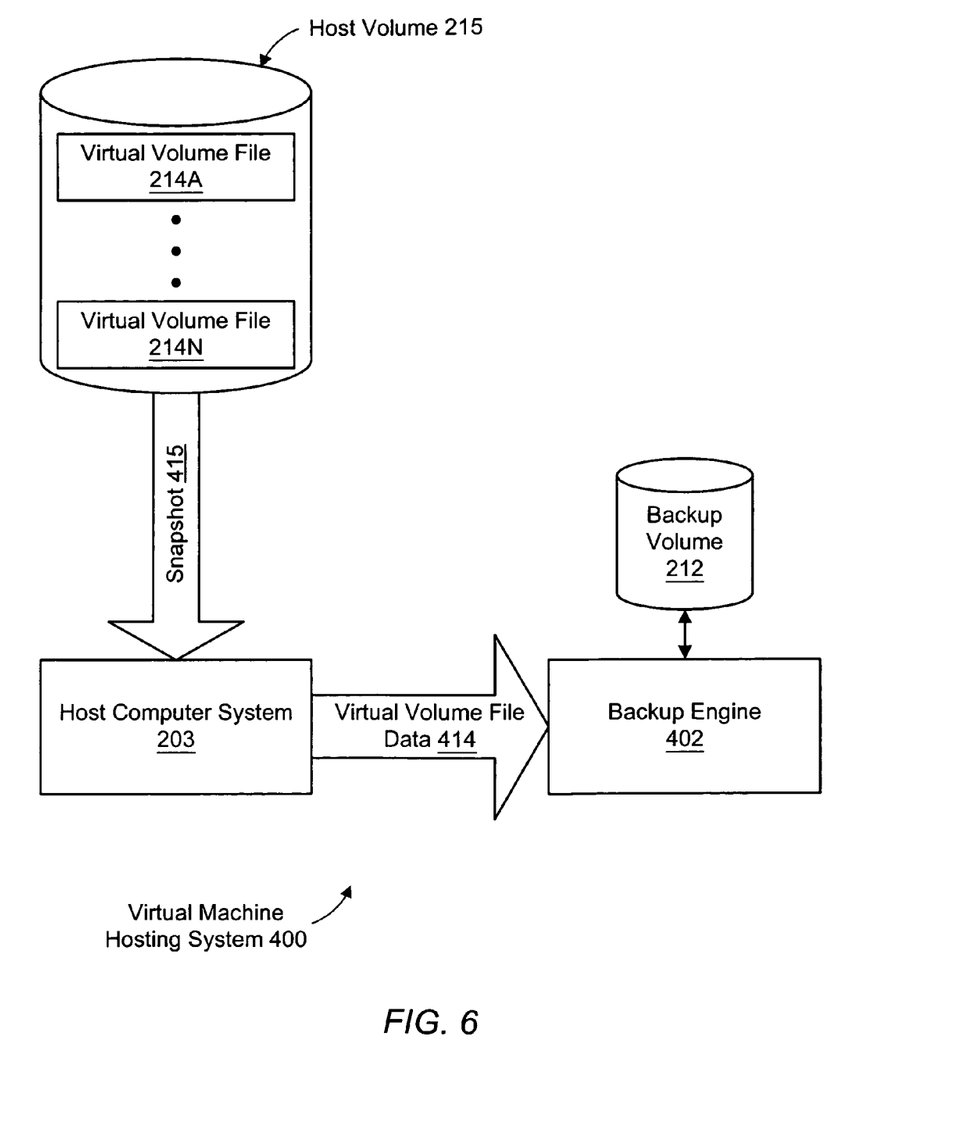
FIG. 6 illustrates a virtual machine hosting system including a host computer system for centralized backup of a plurality of virtual machines according to one embodiment.

FIG. 6 illustrates a virtual machine hosting system 400 including a host computer system 203 for centralized backup of a plurality of virtual machines according to one embodiment. In one embodiment, virtual volume files 214A-214N corresponding to virtual volumes are stored on a host volume 215. A virtual volume file may include some or all of the software (e.g., OS and applications), application and OS configuration files, and other suitable data for use or execution by the respective virtual machine. As is discussed further below, a virtual volume file may be interpreted as one or more virtual volumes by the virtual machine hosting system 400.

As is discussed with reference to FIG. 1, various products may be used as virtual machine hosting software in the virtual machine hosting system 400. In one embodiment, the virtual machine hosting software may comprise the Microsoft Virtual Server product available from Microsoft Corp. (Redmond, Wash.). In one embodiment, the virtual machine hosting software may comprise various products available from VMWare, Inc. (Palo Alto, Calif.), now owned by EMC Corporation. Various virtual machine hosting software products may differ in the format of the virtual volume files 214A-214N they create. Generally, however, the virtual volume files created by various products may comprise a header (e.g., identifying the file as usable by a particular virtual machine hosting software product) and volume data (i.e., data similar to that of a non-virtual volume storable on a physical disk drive). The methods and systems described herein, specifically with reference to FIGS. 6 and 7, are contemplated for use with any virtual machine hosting software product that creates virtual volume files which comprise such volume data.

For example, in an embodiment using the Microsoft Virtual Server product as virtual machine hosting software, a virtual volume file may be stored as a .vhd (virtual hard disk) file. A .vhd file may be stored in a file system as a standard "flat" file. In one embodiment, part of the contents of a .vhd file may internally resemble a hard disk comprising standard NTFS/FAT partitions. Accordingly, a .vhd file may comprise initial sectors, a partition table, and volume data. The initial sectors of the .vhd file may comprise a file header which identifies the file as usable by Microsoft Virtual Server product. By examining the partition table and volume data within the .vhd file, the virtual machine hosting system 400 may interpret the .vhd file as one or more virtual volumes. In this manner, the virtual machine hosting system 400 may locally mount or import the virtual volumes for direct access to the data from the virtual volumes.

In one embodiment, each .vhd file may be created by a user by specifying configuration parameters such as the size and type of the virtual hard disk. A .vhd file may be created on any storage device 215 to which the host file system has access, including IDE, SCSI, RAID, SAN, NAS, etc. A virtual machine may then access a virtualized IDE/SCSI device which is mapped to the underlying physical device 215. Virtual machines may access .vhd files on substantially any storage topology, including SAN and NAS configurations, which are supported by the underlying host 203. A .vhd file may be created in support of a dynamically expanding volume (which grows in size as data is added), a fixed-size volume, a differencing volume (which stores a record of changes made to a parent volume), or an undo volume (which saves reversible changes to a volume).

Figure 7:
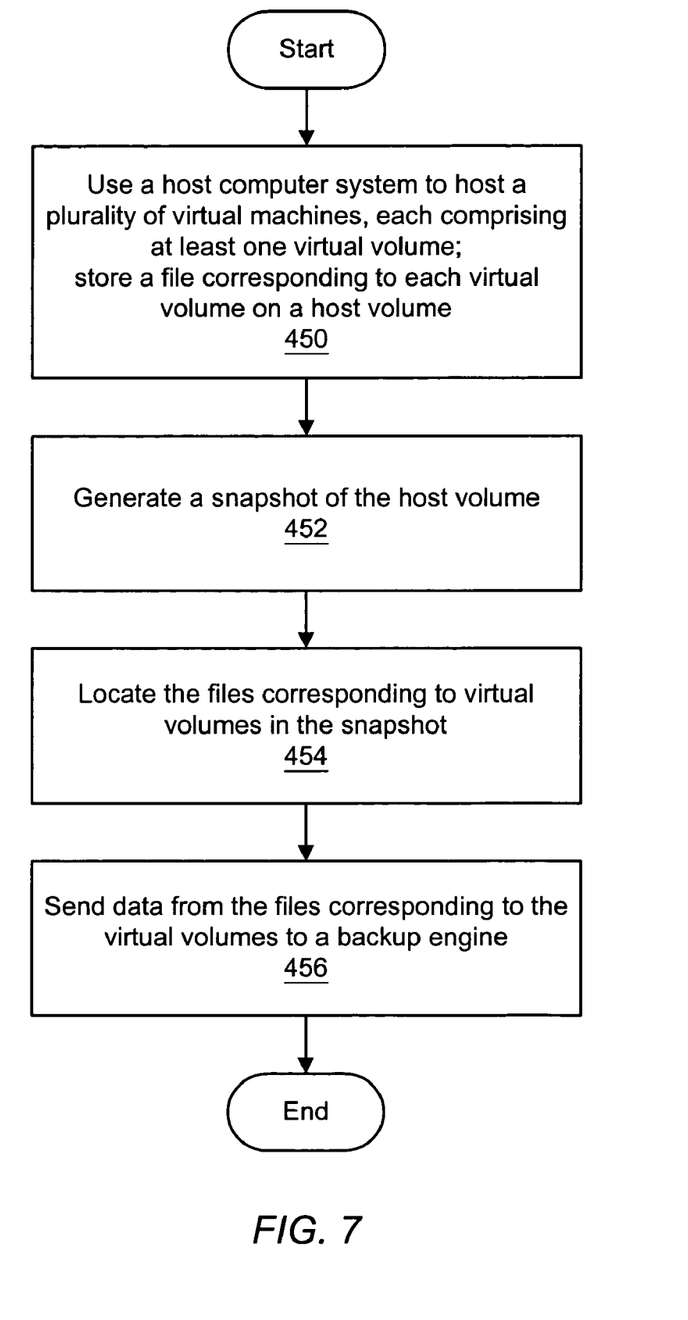
FIG. 7 is a flowchart illustrating a method for centralized backup of a plurality of virtual machines through a host computer system according to one embodiment.

FIG. 7 is a flowchart illustrating a method for centralized backup of a plurality of virtual machines through a host computer system 203 according to one embodiment. Blocks that are implemented in software may represent a plurality of instructions comprising the software which, when executed on a suitable computer system, perform the function(s) described for the blocks. In 450, a host computer system 203 is used to host a plurality of virtual machines, as is described above with reference to FIG. 1. Each of the virtual machines 208A-208N comprises at least one respective virtual volume 213A-213N. Each virtual volume file 214A-214N stored by the host 203 on the host volume 215 may include the data from one or more virtual volumes 213A-213N.

In 452, a snapshot 415 is generated for any host volume 215. The snapshot 415 may comprise the contents of the host volume 215 at a particular point in time. Therefore, the snapshot 415 may include the virtual volume files 214A-214N as well as other data stored on the host volume 215. The snapshot 415 may be generated using various storage management products such as products available from VERITAS Software Corporation (Mountain View, Calif.). In one embodiment, the operation of the corresponding virtual machines 208A-208N may be suspended temporarily during generation of the snapshot 415. Using a user interface command or application program interface (API), the virtual machines may be instructed to flush any I/O buffers prior to generation of the snapshot 415.

In 454, the virtual volume files 214A-214N corresponding to the plurality of virtual volumes 213A-213N may be located within the snapshot 415. In one embodiment, the virtual volume files 214A-214N may comprise .vhd files. To locate the virtual volume files 214A-214N and their volume data, the virtual machine hosting system 400 may determine the sector boundary of the data for each virtual volume within the virtual volume files within the snapshot 415.

In 456, at least a subset of data 414 from the virtual volume files 214A-214N is sent to a backup engine 402 for backup. The backup engine 402 may be located on a same or different computer system as the host 203. The data from the virtual volumes may be piped to the backup engine 402 in one embodiment. In one embodiment, the virtual volume files 214A-214N may be translated and exposed to the backup engine 402 as normal RAW volumes. The backup engine 402 may comprise an image processing component which is configured to locate and process files, folders, and other subsets of a volume for storage management tasks. In one embodiment, the backup engine may comprise the VERITAS Backup Exec product available from VERITAS Software Corporation (Mountain View, Calif.). The image processing component may comprise the VERITAS Federated Mapping Service available from VERITAS Software Corporation (Mountain View, Calif.).

In one embodiment, entire virtual volume files 214A-214N may be sent to the backup engine in 456 after their sector boundaries are located within the snapshot 415 in 454. In another embodiment, the virtual volume file data 414 sent to the backup engine 402 may comprise only a subset of the data from one or more virtual volumes. The subset may comprise one or more sequences of blocks, one or more files, and/or one or more directories. This subset may be specified by a user, e.g., using the browser 300 discussed with reference to FIG. 5. In one embodiment, the backup engine 402 may locate and process a subset of the data after receiving entire virtual volume files 214A-214N.

Backed-up data may be restored from the backup volume 212 to the virtual volumes 213A-213N in a manner substantially independent of execution of the virtual machines. In one embodiment, operation of the corresponding virtual machine of the target virtual volume may be suspended during the restoration process to maintain the integrity of the target virtual volume. Suspension of the virtual machine's operation may be performed through a user interface command, an application program interface (API), or other suitable interfaces to the virtual machine hosting software. To suspend its operation, the virtual machine may be shut down or merely paused. In another embodiment, the virtual machine may continue operation but may be instructed to dismount the target virtual volume to maintain the integrity of that volume.

In one embodiment, the stored data may be read and processed (e.g., by the backup engine 402) as one or more RAW volume images. One or more subsets of the volume images may be selected for restoration. The restoration process may restore entire .vhd files or subsets of .vhd files to the host volume 215. After restoration of the backed-up data, the target virtual machine may be restarted or unpaused to resume its operation.

Figure 8:
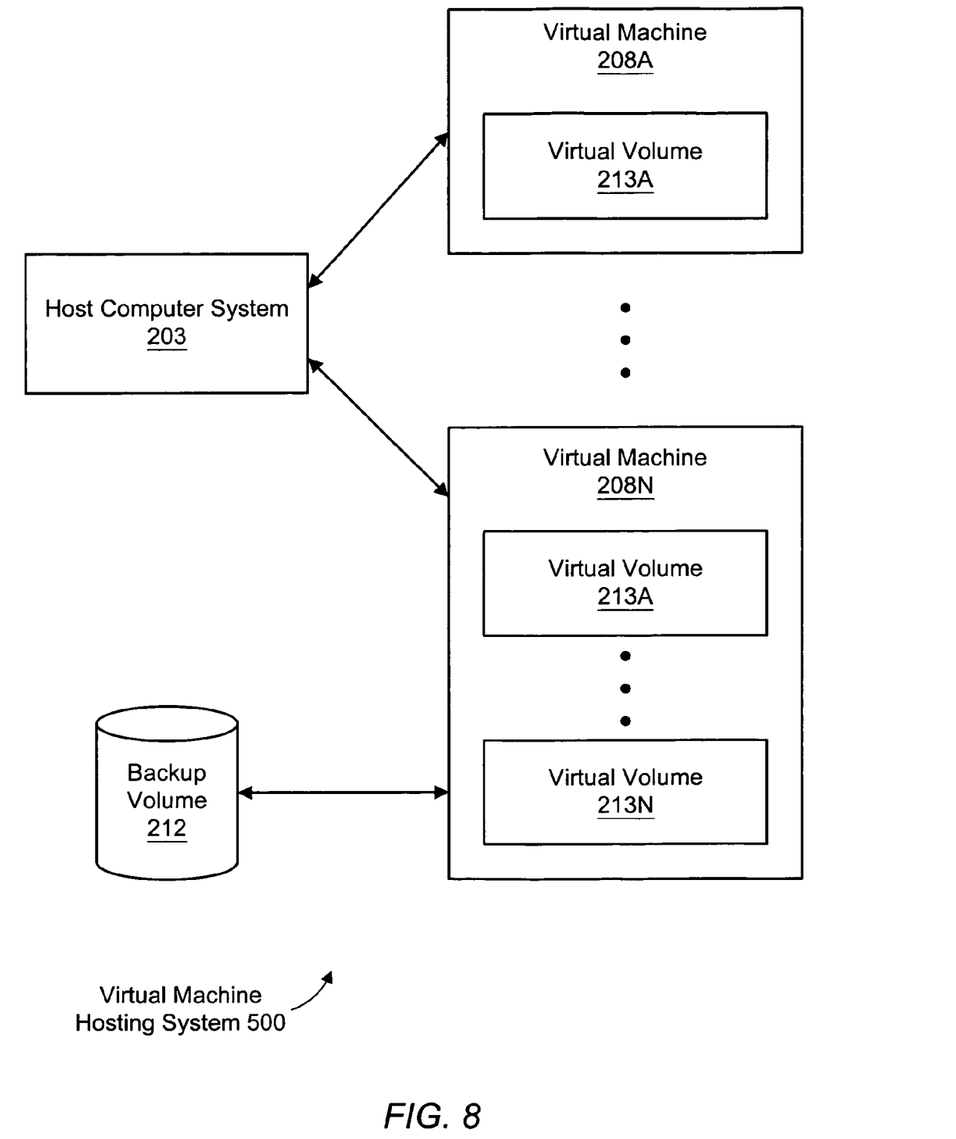
FIG. 8 illustrates a virtual machine hosting system using a virtual machine for centralized backup of a plurality of virtual machines according to one embodiment.

FIG. 8 illustrates an embodiment of a virtual machine hosting system 500 using a virtual machine 208N for centralized backup of a plurality of virtual machines. In one embodiment, one virtual machine 208N may be used as the central computer system for backup or restoration of a plurality of virtual volumes. The central virtual machine 208N may access the other virtual volumes (e.g., virtual volume 213A) by locally mounting or importing them through virtual I/O channels to the other virtual machines. In one embodiment, the virtual machines exporting their virtual volumes for backup or restoration may dismount those virtual volumes or otherwise employ measures to insure the integrity and security of the virtual volumes. The central virtual machine 208N may then use standard backup or restoration techniques on the virtual volumes while bypassing the need to run agent software on the other virtual machines.

Exemplary Computer Systems

Figure 9:
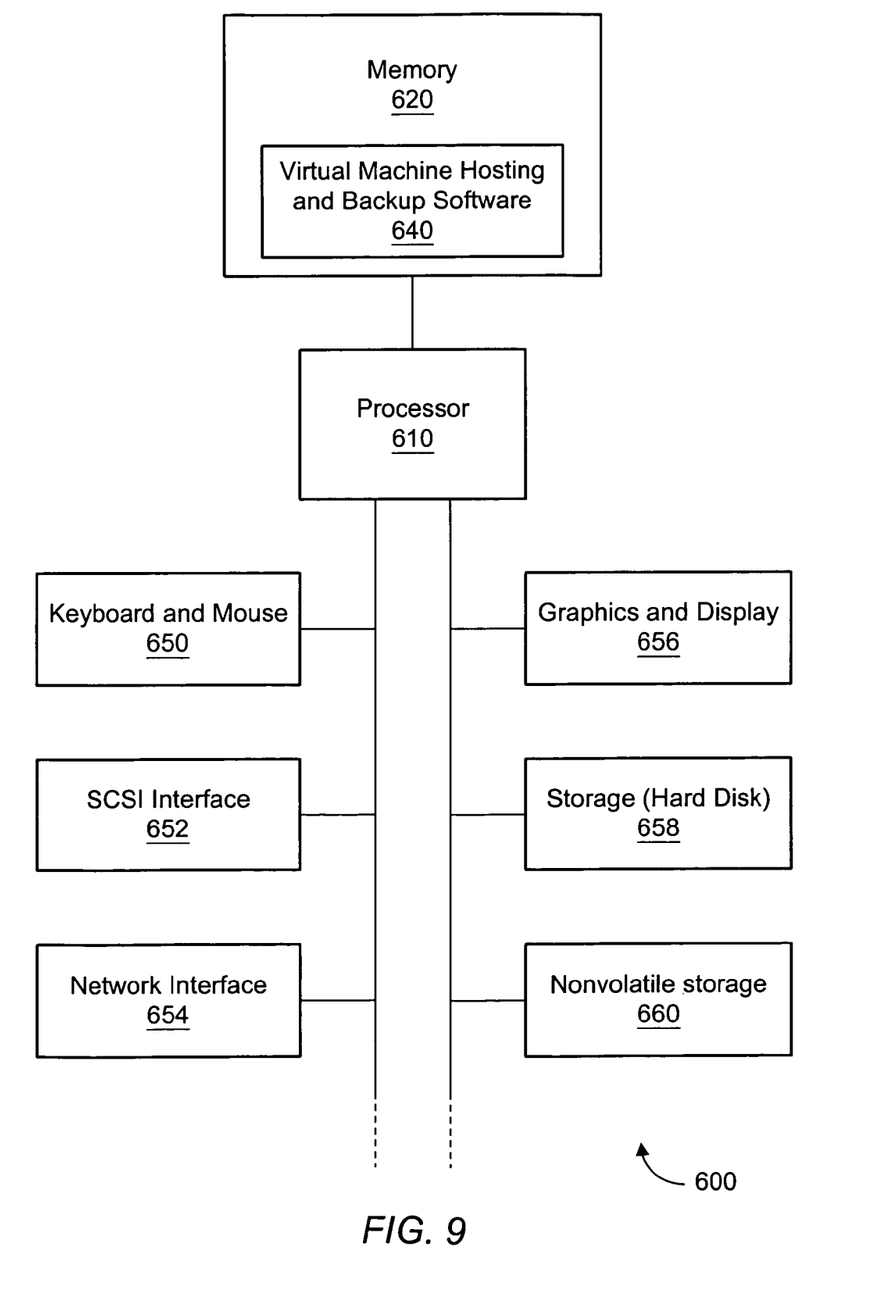
FIG. 9 illustrates a block diagram of a typical computer system for implementing embodiments of the systems and methods described above for centralized backup of virtual machines.

FIG. 9 illustrates a block diagram of a typical computer system 600 for implementing embodiments of the systems and methods described above for centralized backup of virtual machines. For example, computer system 600 can be illustrative of one of the previously described servers, e.g., servers configured to host a plurality of virtual machines or servers configured to provide backup services. Computer system 600 may also be illustrative of a virtual machine hosting system 100, 200, 400, 500. As used herein, "computing device" is synonymous with "computer system." Computer system 600 includes a processor 610 and a memory 620 coupled by a communications bus. Processor 610 can be a single processor or a number of individual processors working together. Memory 620 is typically random access memory (RAM), or some other dynamic storage device, and is capable of storing instructions to be executed by the processor, e.g., virtual machine hosting and/or backup software 640. Memory 620 is also used for storing temporary variables or other intermediate information during the execution of instructions by the processor 610.

Computer system 600 may also include devices such as keyboard & mouse 650, SCSI interface 652, network interface 654, graphics & display 656, hard disk 658, and other nonvolatile storage 660, all of which are coupled to processor 610 by a communications bus. In various embodiments, nonvolatile storage 660 may include optical media devices such as read-only or writable CD or DVD, solid-state devices such as nonvolatile RAM, or any other suitable type of nonvolatile storage. It will be apparent to those having ordinary skill in the art that computer system 600 can also include numerous elements not shown in the figure, such as additional storage devices, communications devices, input devices, and output devices, as illustrated by the ellipsis shown. An example of such an additional computer system device is a Fibre Channel interface.

Those having ordinary skill in the art will readily recognize that the techniques 25 and methods discussed above can be implemented in software as one or more software programs, using a variety of computer languages, including, for example, traditional computer languages such as assembly language, Pascal, and C; object oriented languages such as C++ and Java; and scripting languages such as Perl and Tcl/Tk. In some embodiments, software 640 may comprise program instructions executable, for example 30 by one or more processors 610, to perform any of the virtual machine storage management functions or methods described above. Also, in some embodiments software 640 can be provided to the computer system via a variety of computer-accessible media including electronic media (e.g., flash memory), magnetic storage media (e.g., hard disk 658, a floppy disk, etc.), and optical storage media (e.g., CD-ROM 660). Communications media conveying signals encoding the instructions (e.g., via a network coupled to network interface 654) may be provided. In some embodiments, separate instances of these programs can be executed on separate computer systems in keeping with the methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of nodes, the type of operation of the computing system, e.g., cluster operation (failover, parallel, etc.), the number and type of shared data resources, and the number of paths between nodes and shared data resources.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method comprising:
initiating execution of a plurality of virtual machines, wherein each of the plurality of virtual machines comprises at least one respective virtual volume of a plurality of virtual volumes, wherein each of the plurality of virtual volumes corresponds to a respective file, wherein the files are stored on one or more host volumes;
accessing the plurality of virtual volumes through a central computer system; and
using the central computer system to backup data from the plurality of virtual volumes independent of execution of the plurality of virtual machines, thereby bypassing the plurality of virtual machines, wherein using the central computer system to backup the data comprises:
generating snapshots of the one or more host volumes;
locating the files corresponding to the plurality of virtual volumes in the snapshots of the one or more host volumes; and
sending at least a subset of data from the files corresponding to the plurality of virtual volumes to a backup engine.

2. The method of claim 1,
wherein the central computer system comprises a host computer system which hosts the plurality of virtual machines; and
wherein the host computer system comprises the one or more host volumes.

3. The method of claim 2,
wherein the accessing the plurality of virtual volumes comprises accessing the plurality of virtual volumes as child volumes of the one or more host volumes.

4. The method of claim 1,
wherein the central computer system comprises an additional virtual machine, wherein the accessing the plurality of virtual volumes through a central computer system comprises exporting the plurality of virtual volumes to the additional virtual machine.

5. The method of claim 1, further comprising:
specifying a subset of the data from the plurality of virtual volumes for backup;
wherein the using the central computer system to backup the data from the plurality of virtual volumes comprises using the central computer system to backup the subset of the data from the plurality of virtual volumes.

6. The method of claim 1, further comprising:
specifying at least one sequence of blocks from the plurality of virtual volumes for backup;
wherein the using the central computer system to backup the data from the plurality of virtual volumes comprises using the central computer system to backup the at least one sequence of blocks from the plurality of virtual volumes.

7. The method of claim 1, further comprising:
specifying at least one file or directory from the plurality of virtual volumes for backup;
wherein the using the central computer system to backup the data from the plurality of virtual volumes comprises using the central computer system to backup the at least one file or directory from the plurality of virtual volumes.

8. The method of claim 1,
wherein the using the central computer system to backup the data from the plurality of virtual volumes comprises storing the data on a backup volume;
wherein the method further comprises:
reading a subset of the data from the backup volume and restoring the subset of the data to the plurality of virtual volumes.

9. The method of claim 8,
wherein the restoring the subset of the data to the plurality of virtual volumes comprises restoring the subset of the data independent of execution of the plurality of virtual machines.

10. A system comprising:
a plurality of virtual machines, wherein each of the plurality of virtual machines comprises at least one respective virtual volume of a plurality of virtual volumes, wherein each of the plurality of virtual volumes corresponds to a respective file, wherein the files are stored on one or more host volumes; and
a central computer system comprising at least one processor and a memory, wherein the central computer system is communicatively coupled to the plurality of virtual machines, and wherein the memory stores program instructions, wherein the program instructions are executable by the at least one processor to backup data from the plurality of virtual volumes independent of execution of the plurality of virtual machines, thereby bypassing the plurality of virtual machines, wherein, in backing up the data from the plurality of virtual volumes, the program instructions are executable by the at least one processor to:
generate snapshots of the one or more host volumes;
locate the files corresponding to the plurality of virtual volumes in the snapshots of the one or more host volumes; and
send at least a subset of data from the files corresponding to the plurality of virtual volumes to a backup engine.

11. The system of claim 10,
wherein the central computer system comprises a host computer system which hosts the plurality of virtual machines; and
wherein the host computer system comprises the one or more host volumes.

12. The system of claim 10,
wherein in backing up the data from the plurality of virtual volumes, the program instructions are executable by the at least one processor to store the data on a backup volume; and
wherein the program instructions are executable by the at least one processor to read a subset of the data from the backup volume and restore the subset of the data to the plurality of virtual volumes.

13. The system of claim 10,
wherein the central computer system comprises an additional virtual machine, wherein the plurality of virtual volumes are exported to the additional virtual machine for backup.

14. A tangible computer-accessible storage medium comprising program instructions, wherein the program instructions are computer-executable to implement:
initiating execution of a plurality of virtual machines, wherein each of the plurality of virtual machines comprises at least one respective virtual volume of a plurality of virtual volumes, wherein each of the plurality of virtual volumes corresponds to a respective file, wherein the files are stored on one or more host volumes;
accessing the plurality of virtual volumes through a central computer system; and
using the central computer system to backup data from the plurality of virtual volumes independent of execution of the plurality of virtual machines, thereby bypassing the plurality of virtual machines, wherein using the central computer system to backup the data comprises:

generating snapshots of the one or more host volumes;

locating the files corresponding to the plurality of virtual volumes in the snapshots of the one or more host volumes; and sending at least a subset of data from the files corresponding to the plurality of virtual volumes to a backup engine.

15. The tangible, computer-accessible storage medium of claim 14, wherein the central computer system comprises a host computer system which hosts the plurality of virtual machines; and wherein the host computer system comprises the one or more host volumes.

16. The tangible, computer-accessible storage medium of claim 14, wherein in using the central computer system to backup the data stored on the plurality of virtual volumes, the program instructions are further computer-executable to implement storing the data on a backup volume;

wherein the program instructions are further computer-executable to implement reading a subset of the data from the backup volume and restoring the subset of the data to the plurality of virtual volumes.

17. The tangible, computer-accessible storage medium of claim 14, wherein the central computer system comprises an additional virtual machine;

wherein in accessing the plurality of virtual volumes through a central computer system, the program instructions are further computer-executable to implement exporting the plurality of virtual volumes to the additional virtual machine.

* * * * *

UNITED STATES PATENT AND TRADEMARK OFFICE
CERTIFICATE OF CORRECTION

PATENT NO. : 7,669,020 B1  Page 1 of 1
APPLICATION NO. : 11/119600
DATED : February 23, 2010
INVENTOR(S) : Shah et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1332 days.

Signed and Sealed this

Seventh Day of December, 2010

David J. Kappos
*Director of the United States Patent and Trademark Office*